UNITED STATES PATENT OFFICE.

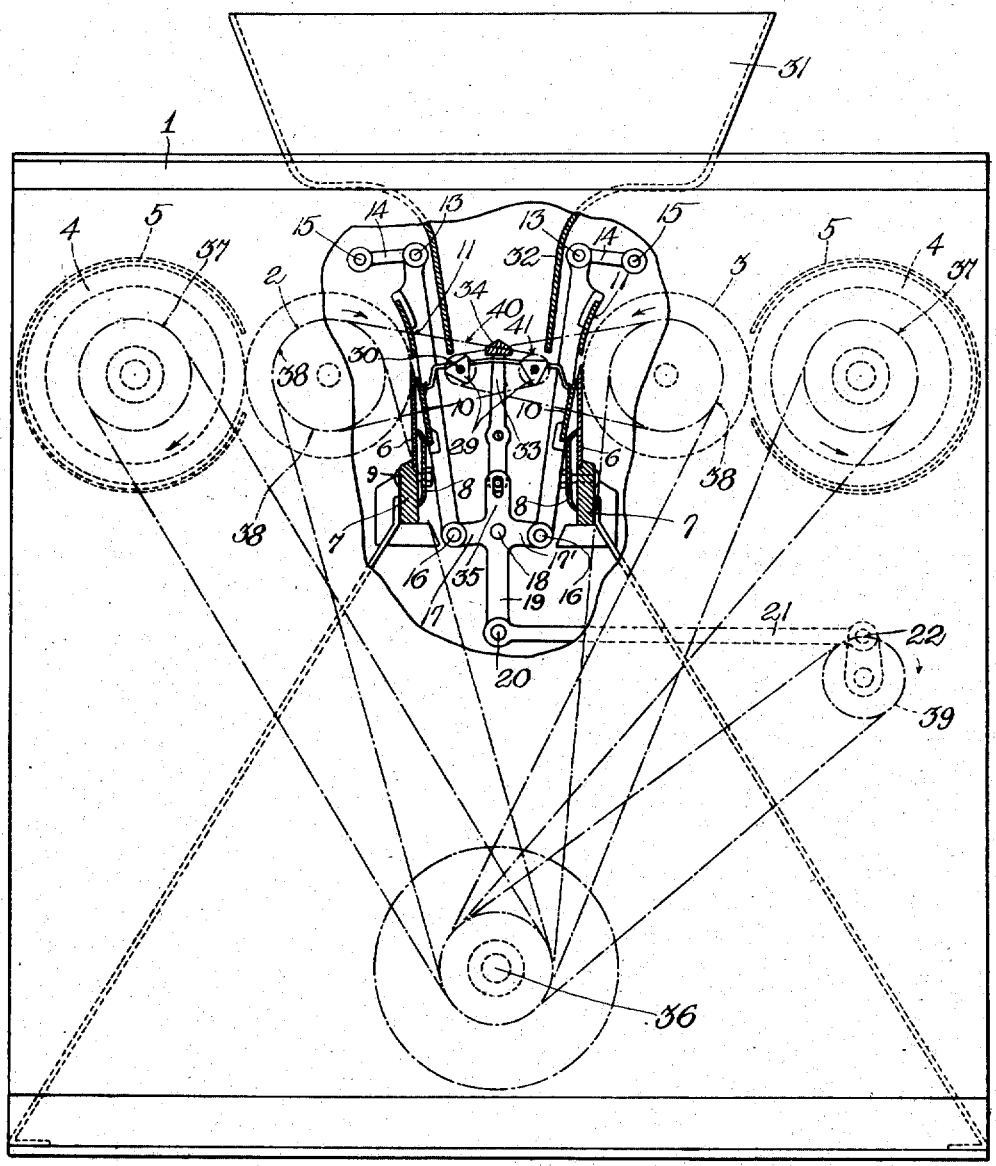

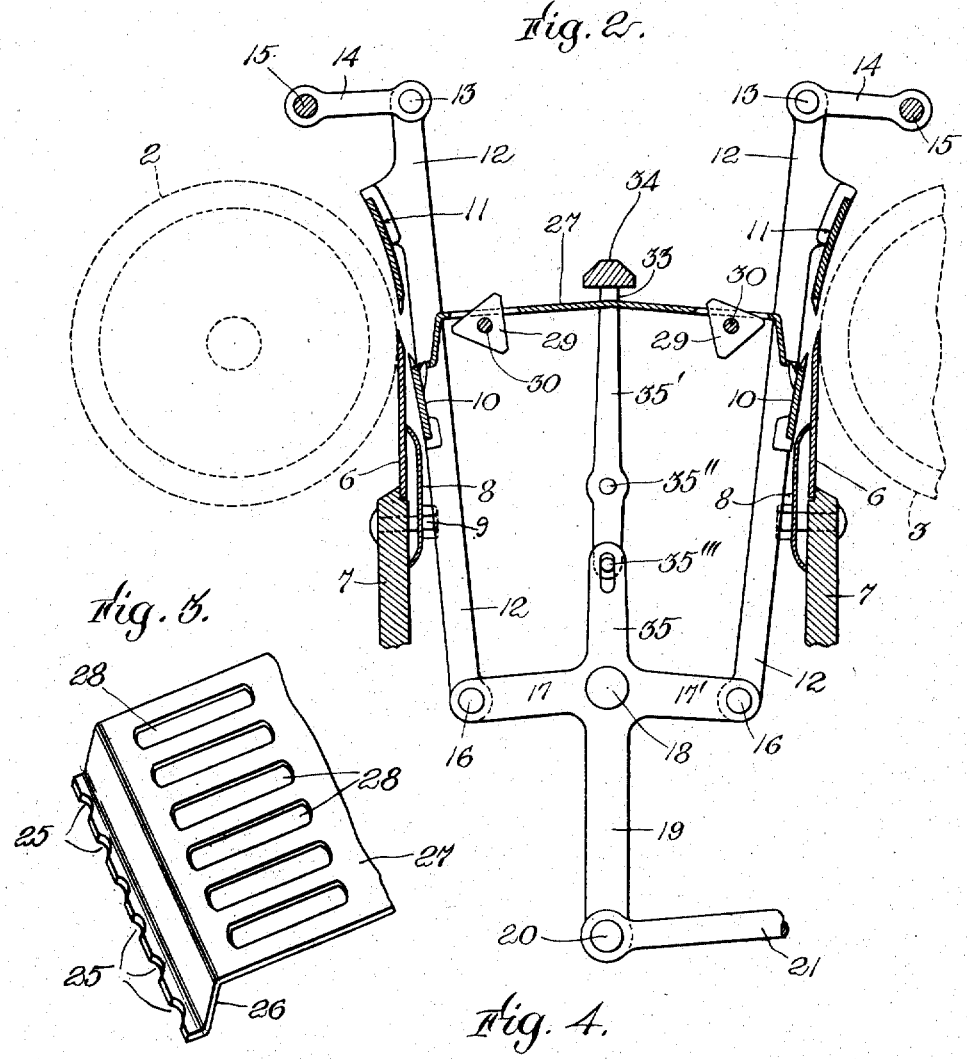

NORMAN PAIN PEARSE, OF LONDON, ENGLAND.

COTTON-GIN.

1,212,672. Specification of Letters Patent. Patented Jan. 16, 1917.

Application filed September 25, 1911. Serial No. 651,064.

*To all whom it may concern:*

Be it known that I, NORMAN P. PEARSE, a subject of the King of Great Britain, whose residence is London, England, and whose post-office address is 28 Queen street, London, E. C., England, have invented an Improvement in Cotton-Gins, of which the following description, in connection with the accompanying drawings, is a specification, like letters on the drawings representing like parts.

The present invention relates to an apparatus for the ginning of cotton and other fibers, and more particularly to the type known as roller gins, wherein a cylindrical roller having a rough fiber-catching periphery of horsehair cloth, or the like, is rotated to coöperate with a fixed doctor knife substantially tangent thereto with mechanism for feeding the cotton to the roll adjacent said fixed doctor knife, and agitating it to effect a rapid and complete separation of the seeds from the fiber.

The invention consists in an improved construction of the agitating or clearer mechanism for this purpose, which is arranged to vibrate rapidly adjacent the operative edge of the doctor knife beating the fiber from opposite sides with one member acting especially to roll the cotton down over the doctor knife, and an opposed member alternately rolling it in the opposite direction and coöperative especially for easing the cotton and loosening it from in front of the fixed doctor knife so that all the fiber is effectively stripped from the seeds without tearing or breakage thereof taken in connection with a peculiar grid arrangement for feeding the cotton and aiding in the stripping of the seeds by the aforesaid mechanism. The invention provides an arrangement and mounting of these beating or agitating elements which alternately roll and ease the cotton, so that they move together in a path which keeps them quite close and substantially tangent to the roll throughout their range of movement, preventing the escape and breakage of seeds and dispensing with the need for a separate guard plate for this purpose.

Further features of the invention relate to an improved form of the upper or rolling agitating or beating element, whereby it is of greater strength and coöperates to better advantage in feeding the cotton.

A still further feature of the invention relates to a special double construction of the gin, whereby a single feeding device may coöperate with the rolls and clearer mechanism of two ginning rolls.

The above and other features of the invention will be better understood from the following detailed description, taken in connection with the accompanying drawings, and will thereafter be pointed out in the appended claims.

Referring to the drawings, Figure 1 is a transverse vertical section with parts in elevation of a gin constructed in accordance with my invention. Fig. 2 is a similar view of a portion of the apparatus enlarged to better illustrate the improved features. Fig. 3 is a fragmentary detail in perspective of a seed grid designed for use with my invention, and Fig. 4 is a fragmentary detail showing the construction of the beater members.

In the illustrative embodiment of the invention to be described, I have shown my improved gin with a double arrangement of ginning rolls horizontally spaced apart so that a single feeding mechanism may coöperate with both, but it will be understood that in carrying out some of the principal features of the invention this double form is quite immaterial and these features might be carried out quite as well with a single ginning roll, and hence the invention is to be understood not to be limited in this respect, except as required in certain of the more specific claims.

Mounted in a suitable frame 1 are the ginning rolls 2, 3 these having any known or desired construction of rough fiber-catching periphery and having mounted for coöperation therewith rotary doffer brushes 4, 4 shown as partially incased by covers 5. Since the mechanism now to be described is identical for each of the rolls, it will be described with reference to one of them only. The doctor knife 6, which consists, as is usual in this type of gin, of a thin rigid blade, has a seat on a fixed block 7 so as to stand approximately vertical or a little back from vertical when pressed into operative engagement with the ginning roll 2. This blade is pressed against the roll by a clamping plate 8 also having its lower end resting against the block 7 and pressed against the doctor knife by a screw bolt 9. The beating or clearer mechanism consists in a lower blade 10 and an upper blade 11, both fixedly mounted on long links 12 pivoted at their upper ends at 13 to short links 14 which turn on fixed pivots 15 and extend normally slightly tilted upward from the horizontal, as shown. The lower ends of links 12 are pivoted at 16 to links 17 extending at the opposite side from the links 14 and pivoted at 18 so as to support the links 12 for up and down vibratory movement in a manner so that the clearer blades or combs 10, 11 will move throughout their range of movement close to the surface of the roll and to some extent follow its curve. The link arms 17 have rigid therewith an operating arm 19 pivotally connected at 20 to a link 21 from a short operating crank 22. The opposite operative edges of the clearer blades 10, 11 are spaced apart so as to leave some little extent of ginning surface of the roll exposed adjacent and just above the operative edge of the doctor knife 6. The clearer blades 10 and 11 have along their operative edges, as seen in Fig. 4, series of relatively shallow rectangular recesses at intervals, thus leaving each edge formed of short spaced apart rectangular projections 23. The recesses in blade 10 are formed opposite the projections on blade 11, this relation being preserved throughout the length of the blade edges as the projections and recesses are of substantially the same length. This form has been found to be particularly effective for engaging and rolling the seeds as the cotton is stripped therefrom by the coöperative action of the roller and doctor blade since the wide recesses permit even large seeds to enter thereinto, while the shallowness of the recesses prevents the premature passing through of the seeds. The blade 10 also carries on its outer side next its operative edge a series of short obliquely upstanding projections or prongs 24 spaced apart and arranged so that as this blade is lifted in its vibratory movement these projections enter certain recesses of the series 25 formed in the adjacent inwardly extending edge of a downwardly projected portion 26 of seed grid 27. These projections being intermittingly and rapidly projected up through the recesses 25 assist in keeping these recesses open and promote the escape of seeds, when the fiber has been entirely stripped therefrom. The upper clearer may be provided with like downwardly or upwardly and outwardly extending prongs to engage the cotton and promote the turning over thereof. The seed grid 27 which constitutes the bottom of the cotton supply hopper and chute as later described, slopes slightly down toward the ginning point with a series of slots 28. Feeding devices shown as pronged members 29 fixed on a shaft 30 are mounted to operate in the slots 28, these turning in a direction to advance the cotton to the ginning roll. The downwardly turned portion 26 of the grid 27 which is spaced away from the roll some little distance with its lower end inturned toward the roll provides a pocket next the exposed surface of the roll which is adapted to receive seeds from which the fiber has been only partly stripped and keep them from falling away until cleared of fiber, and the constant and rapid projection of the prongs 24 up into this pocket prevents any lodging or packing of material therein. This downwardly and forwardly projected portion 26 of the grid 27 facilitates the feeding of the cotton to the roll by reason of the fact that the top edge of the downward sloping side is close enough to the roll to insure that the cotton shall be engaged by the roll surface, and the lower projecting edge of the grid 27 is just far enough down to cause unstripped seeds to be held until they are again raised and presented at the ginning point by the upward movement of the lower clearer. The curved form of the upper clearer blade 11 likewise contributes to effective feeding action as it reciprocates in a way that lessens the obstruction to the cotton being fed in. This curved form of blade is also desirable in that it is a stronger and more substantial construction.

The cotton is preferably supplied to both rolls 2, 3 from a supply hopper 31 having its roller portion 32 formed as a chute and with the seed grid 27 constituting the bottom thereof as described. This seed grid bottom 27 slopes oppositely downward from a central point 33 toward each roll and a reciprocating member shown as a bar 34 is mounted to operate back and forth over this central part of the bottom so as to feed the cotton in both directions and apportion it to the two rolls. This feed bar 34 may conveniently be fixed to upstanding arms 35 rigid with the arm 19 and swinging therewith about the axis as actuated by the crank 22. The clearer mechanism for the roll 3 is actuated from an arm 17′ rigid with the arm 19 and extending out opposite the arm 17 being in all respects similar thereto and similarly connected to operate the clearer mechanism of the roll 3.

Driving impulse for all the movable parts is preferably imparted from a single drive shaft 36 mounted in the lower part of the framework and connected by suitable belting to pulleys 37 for operating the doffer brushes, to pulleys 38 for operating the ginning rolls, and to a pulley 39 for operating the clearer mechanism. The feeding members 29 may be rotated by belting 40 from the ginning rolls, this belting passing around small pulleys 41 on shafts 30.

It will be observed that the special form of link motion connection for the carriers 12 of the clearer blades cause these to move without tilting to any considerable degree away from the roll in their range of movement so that their operative edges will be at all times close to the periphery of the roll enabling the upper blade 11 to coöperate to the best advantage for pushing and beating the fiber down against the doctor knife while imparting a rolling movement to the seeds, while the lower blade 10 eases up and loosens the cotton so that the fiber is quickly and effectively stripped from the seeds without danger of tearing the same or breaking the fiber on the one hand, or of leaving the stripping incomplete on the other. By reason of the fact that the upper blade 11 keeps at all times quite close to the roll, it serves of itself as a sufficient means for preventing the escape of seeds past it so that no separate guard plate is required for this purpose. The arrangement of the two ginning rolls to be fed from the single hopper, as shown, enables the single pusher plate 34 to coöperate with both for apportioning and properly feeding the cotton to each roll, thus obviating the necessity for a separate feeder for each roll. In many cases this feeding plate may be found sufficient for reliably feeding the cotton without the need of the additional rotary arm members 29.

It is to be understood that while the several features of the invention as set forth coöperate to produce a particularly effective ginning mechanism, certain of said features are useful and capable of advantageous use in other relations and that likewise the specific forms and structural arrangement of parts can be widely varied without departing from the principles of the invention. I therefore do not desire to be limited in any of these particulars, except as set forth in the appended claims.

Having described my invention, what I claim as new and desire to secure by Letters Patent is:

1. In a ginning apparatus, a ginning roll, a doctor, and oppositely facing clearers mounted in ginning relation to said doctor, a pivoted link mounting for said clearers arranged to direct the movement thereof in a path substantially tangent to the roll at substantially unvarying distances from the roll periphery throughout the range of the movement, and means for imparting vibratory movement to said clearer mechanism.

2. In a ginning apparatus, a ginning roll, a doctor, opposite clearers adapted to be brought alternately into ginning relation with said doctor, and a mounting for said clearers to cause them to move across the roll at a substantially unvarying distance therefrom, said means consisting in a link to which the clearers are fixed and link arms pivotally connected to said link at its ends and extending at opposite sides thereof with connections to fixed pivots.

3. In a ginning apparatus, a ginning roll, a doctor, a seed grid arranged to constitute means for directing the cotton to the ginning point, and opposite spaced apart clearers mounted in ginning relation with said doctor, both of said clearers being members adapted to ease and loosen the cotton at the doctor edge, one of said members being constructed and arranged to coöperate with the seed grid for the escape of seeds.

4. In a ginning apparatus, a pair of horizontally spaced apart ginning rolls arranged side by side, a common chute for supplying cotton to said rolls, doctors, and clearer mechanism coöperative with said rolls, and a reciprocatory pusher mounted intermediate of said rolls for apportioning the cotton equally to each, said pusher and said clearer mechanism having a common mounting and actuating means.

5. In a ginning apparatus, a pair of horizontally spaced apart ginning rolls arranged side by side, a common chute for supplying cotton to said rolls having a horizontally extending seed grid in the bottom thereof, doctors and clearer mechanism coöperative with said rolls, a reciprocatory pusher mounted intermediate of the rolls for apportioning the cotton equally to each, and rotary forwarding means between said pusher and each roll for advancing the cotton to the ginning surface.

6. In a ginning apparatus, a ginning roll, a doctor and clearer mechanism coöperative therewith, a cotton supply chute having a horizontally extending seed grid at its bottom adapted to deliver cotton to the ginning point, a reciprocatory pusher for feeding the cotton toward the roll, and rotary forwarding arms mounted on a rotary shaft intermediate of said pusher and the roll for advancing the cotton to the roll.

7. In a ginning apparatus, a ginning roll having a doctor coöperative therewith, means for supplying cotton to ginning position having a seed grid extending in a general horizontal direction up to near the ginning point and there formed with a downwardly sloping and forwardly inclined edge to form a pocket adjacent the ginning point, and clearer mechanism mounted for vibration to loosen and prevent clogging of the cotton in said pocket.

8. In a ginning apparatus, a roll having a doctor coöperative therewith, means for supplying cotton to the ginning point having a seed grid extending in a generally horizontal direction to near the ginning point and there having a downwardly sloping and a forwardly projecting portion forming a pocket adjacent the ginning point, said forwardly projecting portion having recesses in its edge, and vibratory clearer mechanism having parts to coöperate with the operative edge of the doctor for easing and loosening the cotton and other parts coöperative with said recesses for lifting any partially ginned material in said pocket and keeping said recesses open.

9. In a ginning apparatus, a roll having a doctor coöperative therewith, means for supplying cotton to the ginning point having a seed grid extending in a generally horizontal direction to near the ginning point and there having a downwardly sloping and a forwardly projecting portion forming a pocket adjacent the ginning point, said forwardly projecting portion having recesses in its edge, and vibratory mechanism having a vertically extending clearer blade with a recessed edge for coöperation with the doctor to ease and loosen the seed from the cotton and upwardly extending diverging prongs thereon adapted to extend into said recesses at the upper limit of movement to keep the same clear and raise any material lodged in said pocket.

10. A ginning apparatus comprising a ginning roll having a doctor coöperative therewith, and a clearer mounted for vibration adjacent the operative edge of said doctor, said clearer having relatively shallow wide recesses in its operative edge spaced apart to leave like short relatively wide projections between them thus furnishing a relatively large seed engaging edge, said recesses having a greater width than depth whereby large seeds may find their way to the recesses, and the shallowness of said recesses prevent the premature passing through of the seeds.

11. In a ginning apparatus, a roll having a doctor coöperative therewith, a seed grid extending horizontally adjacent the operative edge of said doctor with recesses formed along its edge, and a clearer mounted for vibration adjacent the ginning point, said clearer having recesses formed along its edge and oblique projections for agitating and loosening the cotton.

12. In a ginning apparatus, a roll having a doctor coöperative therewith, and spaced apart clearers having oppositely facing operative edges mounted in spaced apart relation for reciprocation adjacent the ginning point, the edge of each of said clearers having relatively shallow wide recesses alternating with relatively short wide projections, with the projections on one clearer opposite the recesses in the other.

In testimony whereof, I have signed my name to this specification, in the presence of two subscribing witnesses.

NORMAN PAIN PEARSE.

Witnesses:
EDWARD MAXWELL,
CLYDE L. ROGERS.

Copies of this patent may be obtained for five cents each, by addressing the "Commissioner of Patents, Washington, D. C."